Figures 1, 2:
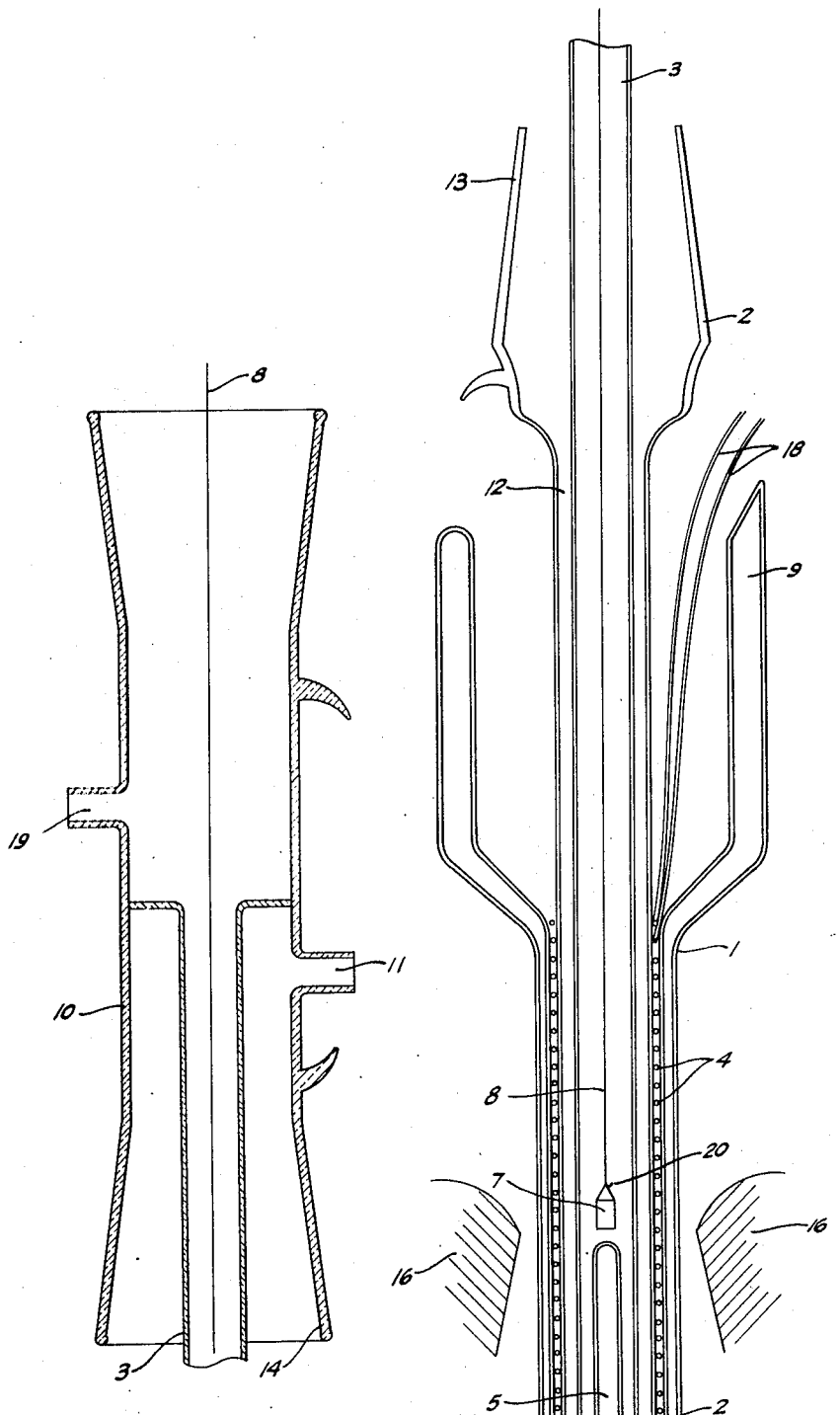

United States Patent

Yates

[15] 3,665,297

[45] May 23, 1972

[54] APPARATUS FOR DETERMINING MAGNETIC SUSCEPTIBILITY IN A CONTROLLED CHEMICAL AND THERMAL ENVIRONMENT

[72] Inventor: Kenneth P. Yates, Fullerton, Calif.

[73] Assignee: Union Oil Company of California, Los Angeles, Calif.

[22] Filed: Mar. 4, 1970

[21] Appl. No.: 888,969

[52] U.S. Cl. ............................................324/34 S, 23/253 R
[51] Int. Cl. ..............................................G01r 33/12
[58] Field of Search ...................324/34 R, 34 S; 23/253 R

[56] References Cited

OTHER PUBLICATIONS

Nakagome et al.; Curie–Cheneveau Magnetic Balance Employing Photocompensation The Review of Scien. Inst.; Vol. 37; No. 7; July 1966 pp. 852– 856

Mulay et al.; Magnetic Susceptibility: Trends in Instrumentation, Research & Applications; Analytical Chemistry; Vol. 36; No. 5; April 1964 pp. 414R– 415R – Oort, W.; A Modification of Sucksmiths Method for the Measurement of Susceptibilities of Para– and Ferro magnetic Materials; Jour. Scien. Inst., Vol. 28 No. 9; Sept. 1951 pp. 279– 282

Senfle et al.; Quartz Helix Magnetic Susceptibility Balance using the Curie– Cheneveau Principle; Review Scien. Inst.; Vol. 29 No. 5; May 1958 pp. 429– 432

Mulay et al.; Magnetic Susceptibility: Recent Aspects of Instrumentation & Application; Analytical Chemistry; Vol. 38; No. 5; April 1966; p. 503R Primary Examiner—Michael J. Lynch
Assistant Examiner—R. J. Corcoran
Attorney—Milton W. Lee, Richard C. Hartman, Lannas S. Henderson, Dean Sandford, Robert E. Strauss and Michael H. Laird

[57] ABSTRACT

An apparatus for determining the static magnetic susceptibility of dia- and paramagnetic compositions in a controlled chemical and thermal environment comprises an elongate dewar flask containing a first inner tube sealably attached to the interior of the dewar flask at the lower end defining an annular volume between the first tube and the dewar flask, a second tube removably concentrically positioned within the said first tube defining an annular passage and being open at its lower end in communication with the annular passage, a sample container positioned within the second tube and suspended from a micro balance, means for heating and cooling the interior or the second tube and said sample and for introducing and withdrawing fluids from the interior of the second tube and the annular passage between the first and second tubes and a relatively high field density magnet positioned proximate the sample container.

5 Claims, 2 Drawing Figures

Patented May 23, 1972 3,665,297

INVENTOR.
KENNETH P. YATES
BY
James S. Henderson
ATTORNEY

APPARATUS FOR DETERMINING MAGNETIC SUSCEPTIBILITY IN A CONTROLLED CHEMICAL AND THERMAL ENVIRONMENT

BACKGROUND

The variation in magnetic susceptibility of dia- and paramagnetic metals and alloys, generally weakly dia- and para-magnetic forms of these compositions, upon modification of the chemical or thermal state of these compositions has provided yet another analytical tool for obtaining insight into the chemical and physical characteristics of numerous, often complex compositions. The flexibility of analytical methods involving magnetic susceptibility has been investigated by numerous authors including J. T. Richardson, I&EC Fundamentals, 3(2), 154 (1964); W. O. Milligan and J. T. Richardson, J. Phys. Chem., 59, 831 (1955); F. N. Hill and P. W. Selwood, JACS, 71, 2522 (1949); and G. T. Rymer, J. M. Bridges, and J. R. Tomlinson, J. Phys. Chem., 65, 2152 (1961). These and other investigators have reported comprehensive information regarding the susceptibilities of a variety of compositions. A readily available source for basic information on any given composition are the bulk magnetic susceptibility tables in the Chemistry and Physics Handbook, e.g., the 45th Edition (1964–1965.

Magnetic susceptibility measurements enable the determination of the chemical form of weakly para- and/or diamagnetic substances in complex compositions by reference to the bulk susceptibilities of compositions known or suspected to be present and the elemental composition of the material under investigation. Briefly, these methods involved weighing a given amount of the selected composition in a prescribed chemical and/or thermal state and then noting the weight change of the composition upon exposure to a directional high flux density magnetic field. Obviously, the weight of the sample per se does not change upon exposure to a magnetic field. The weight change monitored is a function of the force exerted upon the sample by the applied magnetic field which in turn is a function of the susceptibility of the various constituents of the composition and the force of the applied field. The flux density of the applied field should be sufficient to completely magnetically saturate ferromagnetic materials in the composition. The field densities necessary to accomplish this purpose will of course depend at least in part on the nature of the ferromagnetic substances present. Such information has been published by previous investigators and can be found in compilations such as the Handbook of Chemistry and Physics referred to above and need not be elaborated upon herein. However, in most instances the flux density in the immediate vicinity of the sample should attain at least about 8,000 Gauss, preferably within a range of at least about 8,000 to about 9,200 Gauss. Sample size is usually determined by the amount of material necessary to generate a signal of sufficient intensity and will range from 10 to 100 milligrams depending on the nature of the sample material. However, sample sizes on the order of 20 to about 50 milligrams are presently preferred.

The sensitivity requirements of the balance employed to monitor the minute force changes involved will of course depend upon the variables mentioned above such as field density, sample size and sample composition. The force changes usually observed in such analytical techniques are usually in the range from about 0.2 to about 500 micrograms. Balances capable of monitoring such small changes in applied force are available from several manufacturers. Exemplary of such balances is the Cahn Model RG electro balance marketed by Cahn Division, Ventron Instruments Corp., Paramount, California, having a 2.5 g capacity and a sensitivity of at least 0.1 micrograms.

Although considerable information regarding a given composition can be obtained by steady state analysis of that composition it is often the case that significant characteristics of a sample can be more precisely evaluated both qualitatively and quantitatively by determining the magnetic susceptibility of the sample at two or more different sets of conditions or in two or more chemical states. Even further clarification of the physical and chemical properties and structure of a selected composition can be obtained by monitoring the variation in magnetic susceptibility continuously or intermittently while the sample is undergoing a change in state promoted either by chemical reaction or other variation in the environment such as a change in temperature. This is particularly true in the analysis of compositions containing catalytically active metals and refractory oxide supports such as those commonly employed as chemical, particularly hydrocarbon conversion catalysts. The composition of such catalytic materials can vary substantially depending upon the properties desired in the catalyst. These catalysts can include any of the metals in the Periodic Chart combined with a refractory support such as alumina, silica, boria, zirconia, magnesia, beryllia or combinations thereof such as silica-alumina cogels or admixtures, aluminosilicates, silica-boria and silica-zirconia combinations, cogels and the like. The metals or metal compounds most commonly combined with these refractory oxide supports are the metals of Groups I, II, IV, VI and VIII as the free metals, metal cations, oxides or sulfides.

Since the manner in which these metals or metal compounds are combined and/or distributed with and throughout the refractory oxide support determines the catalytic activity of the resultant composition, an analytical tool such as the magnetic susceptibility apparatus described herein, which enables the evaluation of these parameters would be of substantial value. However, as already mentioned several of the determinations necessary to comprehensively evaluate compositions of the complexity usually found in hydrocarbon conversion catalysts can only be determined, or can be determined much more effectively, by evaluating the susceptibility of the compositions in several different chemical and/or thermal states. For example, it may be desirable to determine the susceptibility of a nickel back-exchanged ammonium or hydrogen zeolite containing molybdenum with the metallic components in the elemental or cationic state followed by evaluation of the susceptibility of the same composition after calcination in the presence of a specific oxidizing atmosphere or after sulfiding by contacting with hydrogen sulfide, carbon disulfide or other sulfur donor. The procedures heretofore available do not allow the degree of flexibility necessary to readily effectuate these objectives. For example, previously available systems required removal of the sample from the susceptability apparatus in order to produce a chemical change in the composition under investigation. Other forms of apparatus might require discontinuance of susceptibility measurements during the course of chemical conversion or calcination. The apparatus of this invention affords the flexibility required by such demanding analytical procedures. At the same time it affords additional advantages in other respects, e.g., by enabling the rapid easy removal of a sample from the apparatus without disturbing the orientation of the ultra-sensitive balances or inducing static electrical charges onto the apparatus which inhibit positioning and handling of the sensitive sample container and suspension systems.

It is therefore one object of this invention to provide an improved apparatus for controlling and varying the environment of a sample during analysis. It is another object of this invention to provide an improved magnetic susceptibility apparatus. Yet another object of this invention is the provision of an analytical apparatus which enables continuous monitoring of a specific property of a sample while varying the characteristics of the sample. Yet another object of this invention is the provision of a magnetic susceptibility apparatus which enables variation of the physical and/or chemical properties of a selected sample during evaluation of the sample's magnetic susceptibility.

In accordance with one embodiment of this invention there is provided an apparatus for controlling and varying the environment of a sample in a predetermined manner during analysis of the sample which comprises an elongate dewar flask having open and closed ends, a first inner tube positioned within the dewar flask and sealably attached to the dewar flask at the closed lower end thereof forming an annular volume between the dewar flask and the first inner tube, a second inner tube positioned within the first inner tube having a lower open end in communication with the annular passageway defined by the first and second tubes and sample containing means for positioning of sample to be analyzed within the second tube at a predetermined position. The entire apparatus should be constructed of nonmagnetic materials at least in the vicinity of the sample position to avoid interference with the magnetic field generated during magnetic susceptibility analysis.

The apparatus of this invention can be better understood by reference to the drawings illustrating a presently preferred embodiment of this apparatus of which FIG. 1 is a side sectional view of the apparatus comprising a dewar flask and two concentrically disposed inner tubes with accompanying sampling suspension means positioned between the two poles of the high intensity magnet; and FIG. 2 is a side sectional view for the top closure for the apparatus of FIG. 1.

Referring now to FIG. 1, the presently preferred embodiment of this apparatus includes an elongate dewar flask 1 having an upper expanded section 9 to facilitate accessibility having a closed lower end protruding axially inwardly at the center to form a thermocouple well 5 which terminates proximate to the desired position of sample container 7. The first inner tube 2 is disposed within dewar flask 1 and sealably attached to the side walls of the dewar flask at the lower end thereof to produce a fluid tight seal and form an annular volume between the dewar flask and inner tube 2 into which a cooling fluid such as liquid nitrogen or air can be introduced to provide for cooling in the interior of the apparatus as desired. A second inner tubular member 3 is positioned coaxially inside the first inner tube 2 having a lower open end 15 terminating proximate to the lower end of inner tube 2 to provide fluid communication between the interior of tube 3 and the annular passageway defined by the exterior of the innermost tube 3 and the interior of the first tube 2. Heating of the interior of tube 3 and the sample within container 7 is facilitated by a non-inductibly wound resistive heater 4 wound about the exterior of inner tube 2 to which current is supplied as desired via leads 18. Resistive heaters of this nature are generally well known in the art and usually are constructed of metallic wire having relatively low conductivity such as 28 gauge Nichrome wire. Sample container 7 is suspended along the vertical axis of the interior tube 3 from a micro balance not shown by a fine fiber 8 having a very low magnetic susceptibility. Fibers particularly suitable for this purpose are silica fibers which can be prepared by drawing from bulk silica sources such as GE 204 silica rod. The sample container 7 is also preferably constructed of material having a very low susceptibility. Pyrex and fused silica are particularly suitable for this purpose. Magnet pole pieces 16 are positioned adjacent the dewar flask at an elevation determined in relation to the position of sample container 7.

The top closure for the apparatus of FIG. 1 is illustrated in FIG. 2 and comprises tubular side wall 10 flanged outwardly at the upper and lower extremities to accommodate fittings on the balance at the upper end and to provide interior surface 14 at the lower end corresponding to the configuration of outer surface 13 at the upper extermity of the first interior tube 2. The several elements of this apparatus are constructed from thermally stable materials such as glass, preferably quartz or pyrex, phenolic resins and the like sealed together with vacuum grease. Apiezon N and silicone vacuum greases are exemplary of suitable sealants and provide excellent seals even at high vacuum.

In this particular embodiment the innermost tube 3 is fixedly attached to the upper closure member 10 so that removal of the upper closure 10 from the remainder of the apparatus, i.e., inner tube 2 and dewar flask 1, also results in withdrawal of inner tube 3 from the lower elements. The upper closure also comprises a fluid inlet or outlet 11 which provides access to the annular passage 18 defined by tubes 2 and 3. This feature enables introduction or withdrawal of chemical treating agents or oxidizing atmospheres during calcination in order to effect chemical changes in the sample.

As previously mentioned, it is often desirable to continuously monitor the susceptibility of samples while the composition undergoes sulfiding or oxidation. For example, when it is desirable to sulfide the sample in situ a sulfiding medium such as 10 percent of hydrogen sulfide or carbon disulfide in hydrogen can be introduced through fluid inlet 19 after which it passes downwardly through the interior of tube 3 over the sample and into the annular passageway 18 as indicated by arrows 17 at the base of the apparatus illustrated in FIG. 1. The fluid then progresses upwardly through annular passage 18 and exits the apparatus through outlet 11. Obviously the direction of fluid flow can be reversed if desired.

An additional advantage provided by this apparatus is the simplicity with which a sample can be removed without disturbing the sensitive suspension or balance systems or introducing static charges into the apparatus which induce the suspending fiber 8 to adhere to the interior walls of tube 3. This procedure is conveniently accomplished by maintaining the closure assembly 10 and interior tube 3 in a stationary position while removing the remainder of the apparatus, i.e., tube 2 and dewar flask 1 in a downward direction. After this step has been accomplished the sample container 7 can be easily removed from hook means 20 on suspending fiber 8 by inserting a cup-like probe or hook into the bottom of interior tube 3 and thereby lifting the sample container off of the suspension system and withdrawing it through the bottom of tube 3. A subsequent sample can then be inserted into the bottom of the open tube in a similar manner and attached to hook 20 without disturbing the sensitive suspension and balance systems.

A further advantage of this apparatus derives from the fact that the radial dimensions of the entire apparatus can be reduced substantially while still providing all the facilities described thereby enabling the use of smaller less expensive magnets to obtain a field having a sufficiently high flux density at the sample location. For example, the entire assembly can be constructed such that the exterior radius of the dewar flask 1 in the sample area is on the order of 1 inch or less so that pole pieces 16 can be positioned very close to the sample container 7. This apparatus thereby enables the use of much smaller magnets resulting in a substantial savings in the original investment.

Other variations and modifications of the preferred apparatus of this invention will of course be apparent to one skilled in the art in view of the aforegoing disclosure in the appended claims.

I claim:

1. An apparatus for containing and controlling the environment of a sample during analysis which comprises an elongate dewar flask having a closed lower end and an open upper end, a first inner nonmagnetic tubular member positioned within said dewar flask sealably attached to the interior of said dewar flask at said lower end and defining an annular volume between the interior of said dewar flask and said first tube, a second elongate tube having an outer diameter less than the inner diameter of said first tube removably positioned within said first tube forming an annular passageway between the inner surface of said first tube and the outer surface of said second tube and having an open lower end positioned proximate to the lower end of said first tube in communication with said annular passage, sample containing means for introducing and positioning a sample to be analyzed within said second tube, first fluid communicating means in fluid communication with the interior of said second tube for removing fluid from or introducing fluid to said interior and second fluid communicating means in fluid communication in which said annular passage for removing fluid from or introducing fluid to said annular passage.

2. The apparatus of claim 1 further comprising heating means positioned within said annular volume for varying the temperature of the interior of said second tube and means for introducing heat exchange fluid into said annular volume.

3. The apparatus of claim 1 further comprising noninductive resistive heater means positioned within said annular volume for varying the temperature of the interior of said second tube, means for introducing heat exchange fluid into said annular volume and fluid communicating means communicating with the interior of said second tube and said annular passage for introducing or withdrawing fluid from said annular passage and the interior of said second tube, suspension means for suspending sample material within said second tube, weighing means cooperating with said suspension means for determining the weight of said sample, and magnetic flux generating means positioned proximate said dewar flask and in substantial alignment with the position of said sample material for generating a magnetic field within said second tube.

4. The apparatus of claim 1 further comprising a resistive electrical heater wound noninductively around the exterior of said first tube extending substantially above and below a predetermined sample position within said second tube, means for introducing heat exchange fluid into said annular volume, fluid communicating means communicating with the interior of said second tube and said annular passage for introducing or withdrawing fluid from said annular passage or the interior of said second tube, suspension means for suspending sample material within said second tube at said predetermined position and thermo-well means extending upwardly axially into the interior of said second tube and terminating proximate to and below said predetermined sample position.

5. An apparatus for containing and controlling the environment of a sample during analysis which comprises an elongate dewar flask having a closed lower end and an open upper end, a first inner nonmagnetic tube positioned within said dewar flask sealably attached to the interior of said dewar flask at said lower end and defining an annular volume between the interior of said dewar flask and said first tube, a second elongate nonmagnetic tube having an outer diameter less than the inner diameter of said first tube removably positioned within said first tube forming an annular passageway between the inner surface of said first tube and the outer surface of said second tube and having an open lower end positioned proximate to the lower end of said first tube in communication with said annular passage, sample containing means for introducing and positioning a sample to be analyzed within said second tube at a predetermined position, magnetic flux generating means positioned adjacent the exterior of said dewar flask and proximate said predetermined sample position for generating a magnetic field within said second tube at said predetermined sample position, electrical resistive heater means wound noninductively about the exterior of said first tube within said annular volume and extending substantially above and below said predetermined sample position for heating the interior of said second tube in the area of said predetermined sample position, and thermowell means extending axially upwardly into the interior of said second tube and terminating proximate to and below said predetermined sample position for introducing temperature sensing means into the area of said predetermined sample position.

* * * * *